United States Patent
Yi et al.

(10) Patent No.: US 10,355,905 B2
(45) Date of Patent: Jul. 16, 2019

(54) METHOD AND APPARATUS FOR TRANSMITTING WI-FI SIGNALS IN UNLICENSED SPECTRUM IN WIRELESS COMMUNICATION SYSTEM

(71) Applicant: LG ELECTRONICS INC., Seoul (KR)

(72) Inventors: Yunjung Yi, Seoul (KR); Hyangsun You, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/325,377

(22) PCT Filed: Jul. 13, 2015

(86) PCT No.: PCT/KR2015/007267
§ 371 (c)(1),
(2) Date: Jan. 10, 2017

(87) PCT Pub. No.: WO2016/006984
PCT Pub. Date: Jan. 14, 2016

(65) Prior Publication Data
US 2017/0208475 A1 Jul. 20, 2017

Related U.S. Application Data

(60) Provisional application No. 62/023,195, filed on Jul. 11, 2014, provisional application No. 62/033,667, filed on Aug. 6, 2014.

(51) Int. Cl.
H04W 74/08 (2009.01)
H04L 27/26 (2006.01)
(Continued)

(52) U.S. Cl.
CPC ...... *H04L 27/2656* (2013.01); *H04L 27/2662* (2013.01); *H04W 16/14* (2013.01); *H04W 74/0816* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2008/0107095 | A1 | 5/2008 | Black et al. |
| 2009/0225696 | A1 | 9/2009 | Ramachandran et al. |

(Continued)

FOREIGN PATENT DOCUMENTS

| | | | |
|---|---|---|---|
| CN | 101695019 A | | 4/2010 |
| CN | 101878625 A | | 11/2010 |

(Continued)

OTHER PUBLICATIONS

Almeida et al., "Enabling LTE/WiFi Coexistence by LTE Blank Subframe Allocation," IEEE ICC 2013—Wireless Communications Symposium, Jun. 9, 2013, pp. 5083-5088, XP032522656.

(Continued)

*Primary Examiner* — Angel T Brockman
(74) *Attorney, Agent, or Firm* — Birch, Stewart, Kolasch & Birch, LLP

(57) ABSTRACT

A method and an apparatus for transmitting a reservation signal in a wireless communication system are provided. A device supporting long-term evolution in unlicensed spectrum (LTE-U) transmits the reservation signal, e.g. clear-to-send (CTS)-to-self, as a form of a Wi-Fi signal to a network.

11 Claims, 15 Drawing Sheets

(51) Int. Cl.
*H04W 16/14* (2009.01)
*H04W 84/12* (2009.01)

(56) References Cited

U.S. PATENT DOCUMENTS

| | | | |
|---|---|---|---|
| 2011/0134746 A1* | 6/2011 | Liu | H04J 1/12 370/201 |
| 2011/0164698 A1 | 7/2011 | Wu | |
| 2011/0261776 A1 | 10/2011 | Ahn et al. | |
| 2012/0069766 A1 | 3/2012 | Fu et al. | |
| 2013/0184030 A1 | 7/2013 | Tavildar et al. | |
| 2014/0038625 A1 | 2/2014 | Palanivelu et al. | |
| 2014/0112289 A1 | 4/2014 | Kim et al. | |
| 2014/0314008 A1 | 10/2014 | Lee et al. | |
| 2014/0341018 A1* | 11/2014 | Bhushan | H04W 28/0289 370/230 |
| 2015/0139293 A1 | 5/2015 | Stanwood et al. | |
| 2015/0208253 A1 | 7/2015 | Kim et al. | |
| 2015/0296415 A1 | 10/2015 | Ling et al. | |
| 2016/0295420 A1* | 10/2016 | Luo | H04W 16/14 |
| 2017/0164236 A1 | 6/2017 | Boldi et al. | |

FOREIGN PATENT DOCUMENTS

| | | |
|---|---|---|
| CN | 102763094 A | 10/2012 |
| CN | 103270804 A | 8/2013 |
| CN | 103503334 A | 1/2014 |
| WO | WO 2013/006988 A1 | 1/2013 |
| WO | WO 2013/087835 A1 | 6/2013 |
| WO | WO 2013/149387 A1 | 10/2013 |

OTHER PUBLICATIONS

Ratasuk et al., "License-exempt LTE deployment in heterogeneous network," Wireless Communication Systems (ISWCS), 2012 International Symposium on, IEEE, Aug. 28, 2012, pp. 246-250.

* cited by examiner

[Fig. 1]
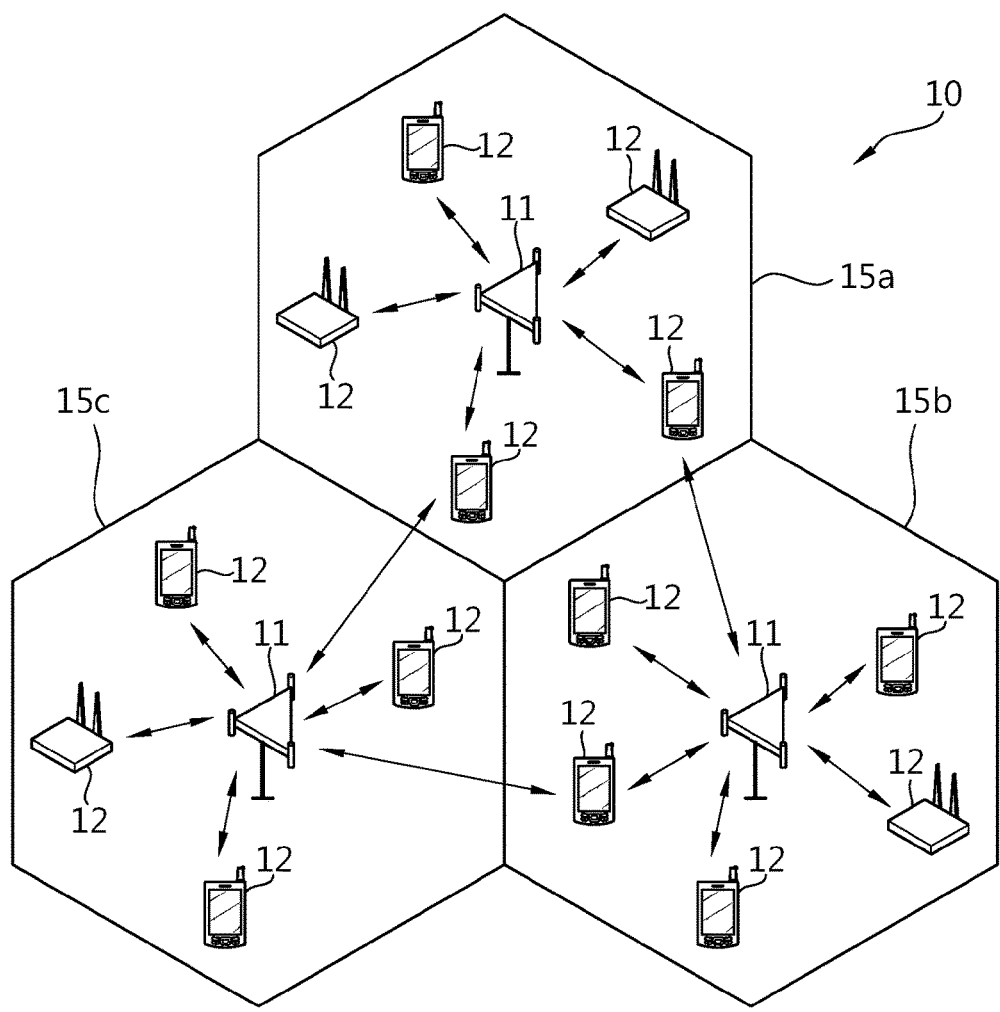
[Fig. 2]
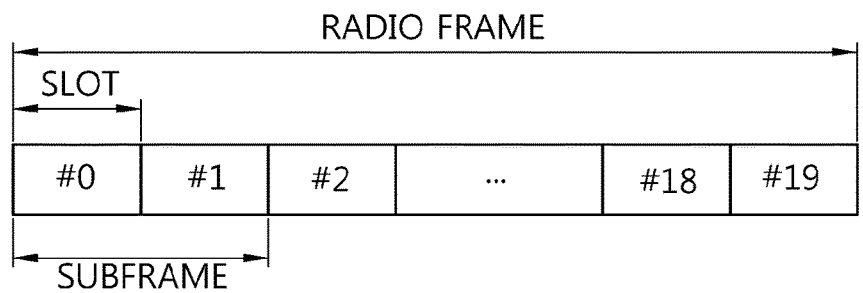

[Fig. 3]
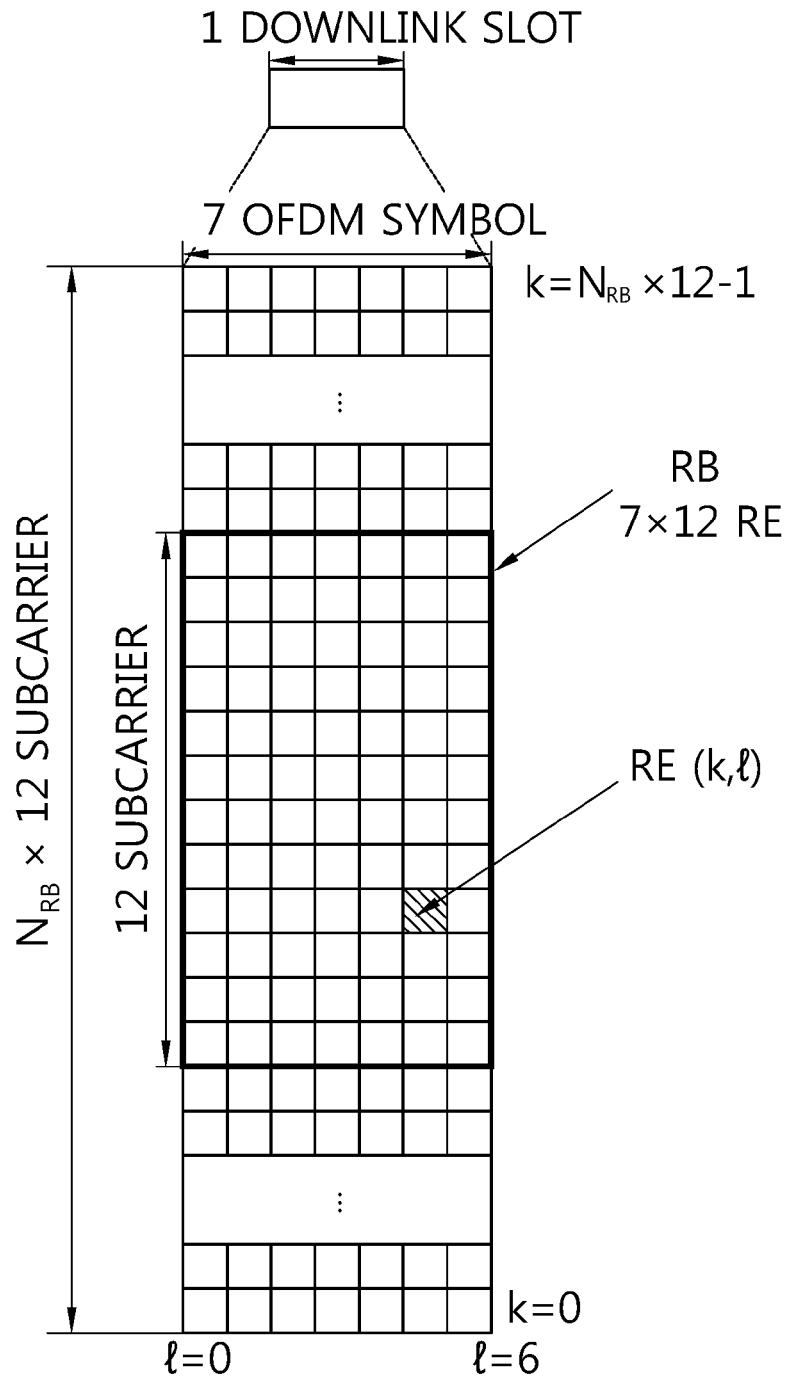

[Fig. 4]
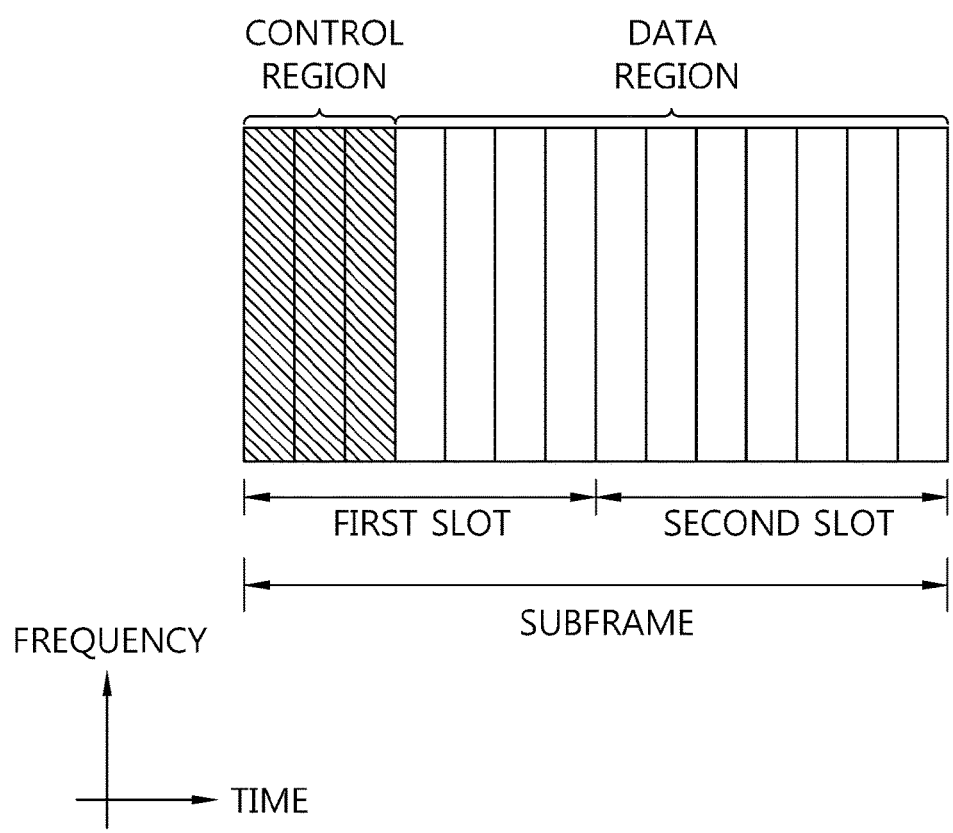

[Fig. 5]
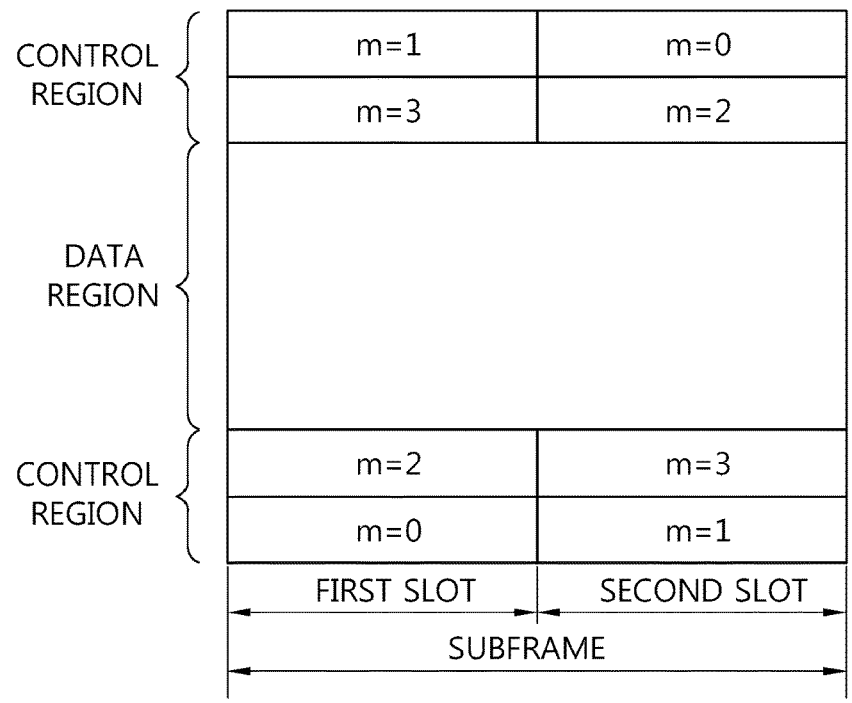
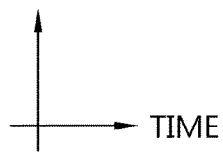
[Fig. 6]
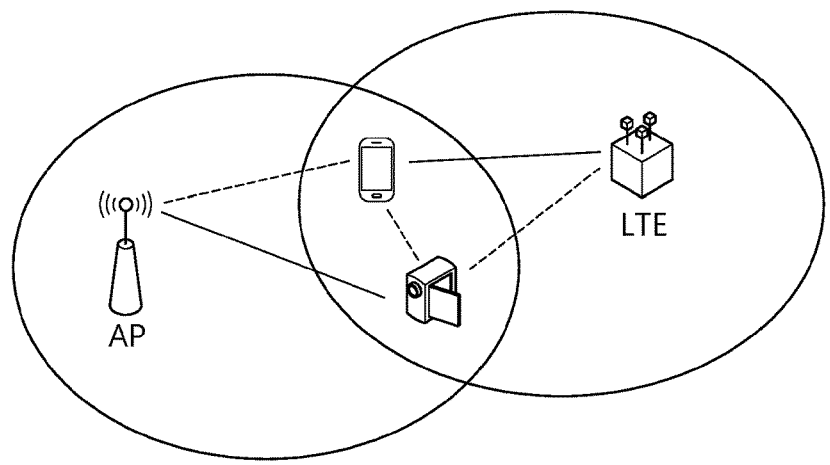

[Fig. 7]
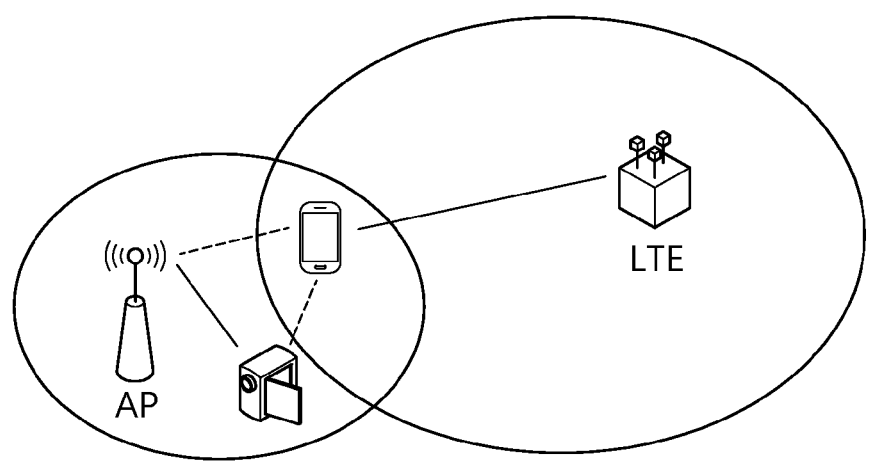

[Fig. 8]
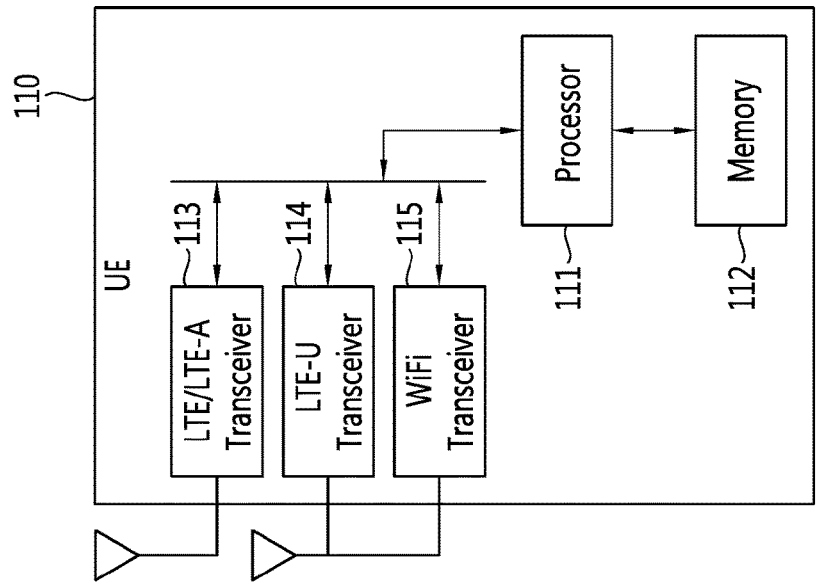
[Fig. 9]
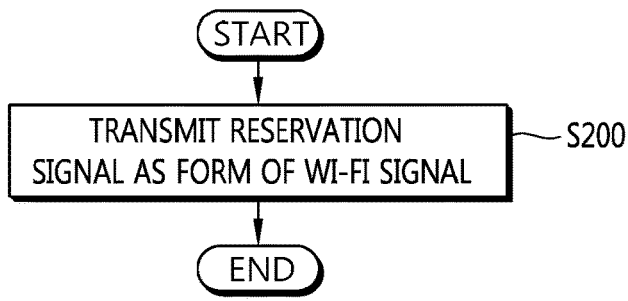

[Fig. 10]
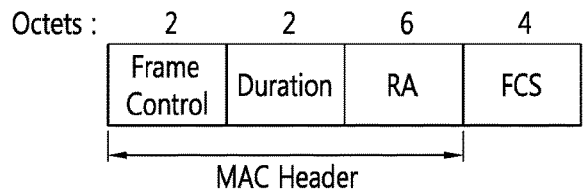
[Fig. 11]
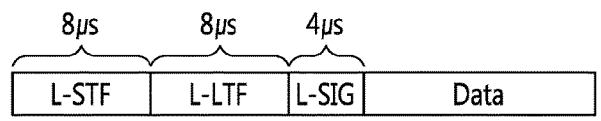
[Fig. 12]
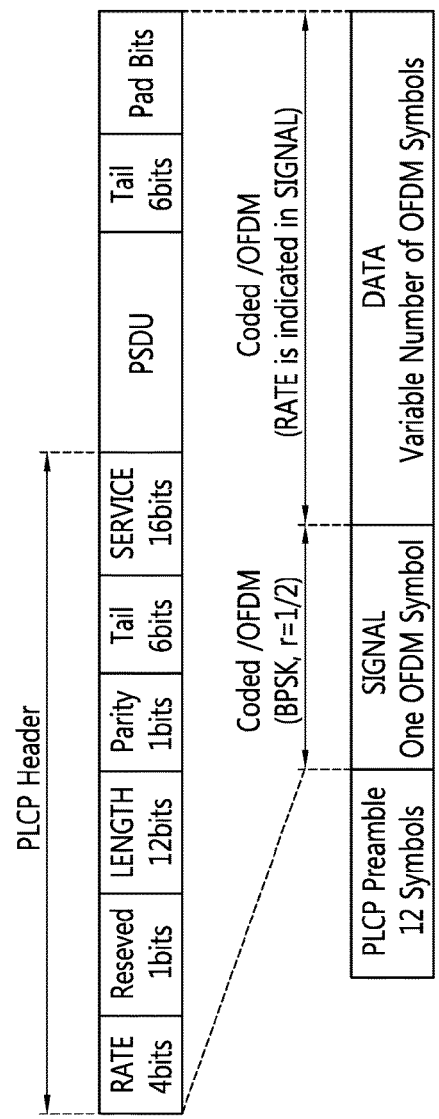

[Fig. 13]
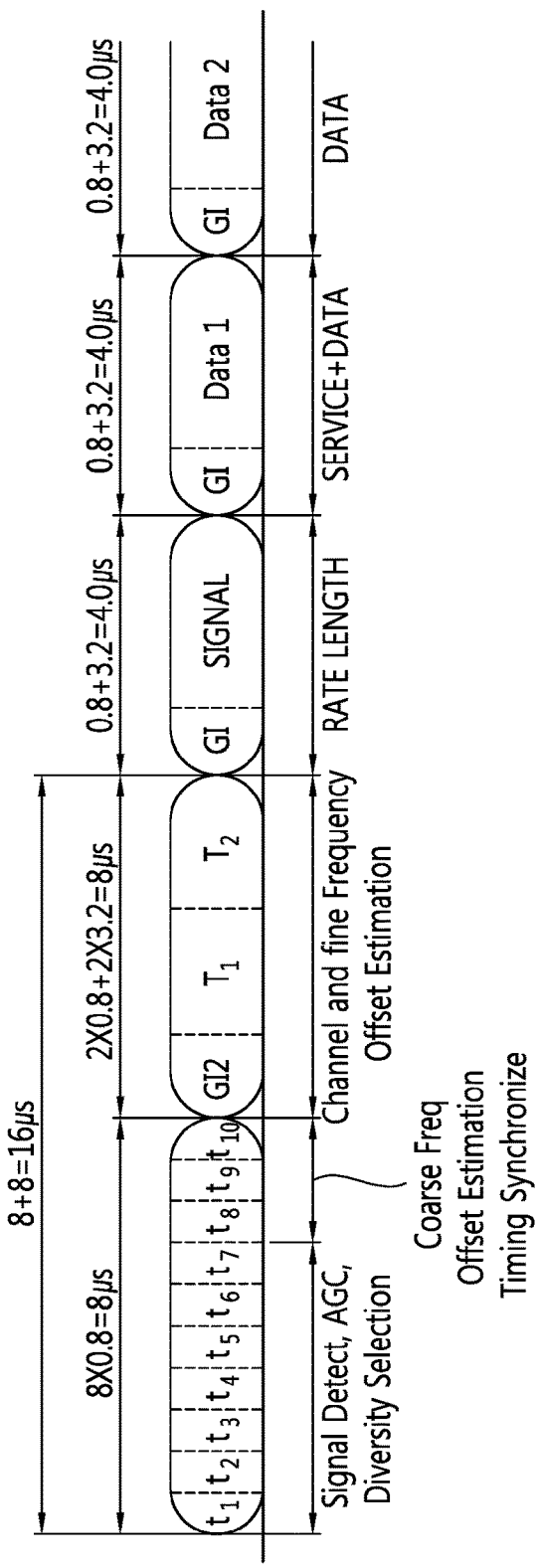

[Fig. 14]
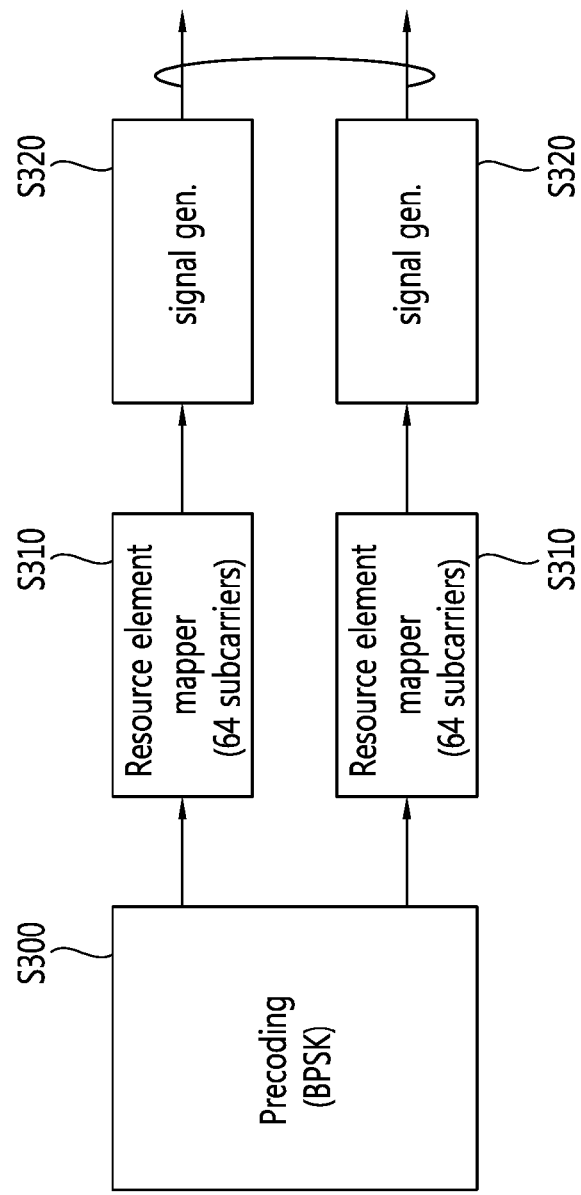

[Fig. 15]
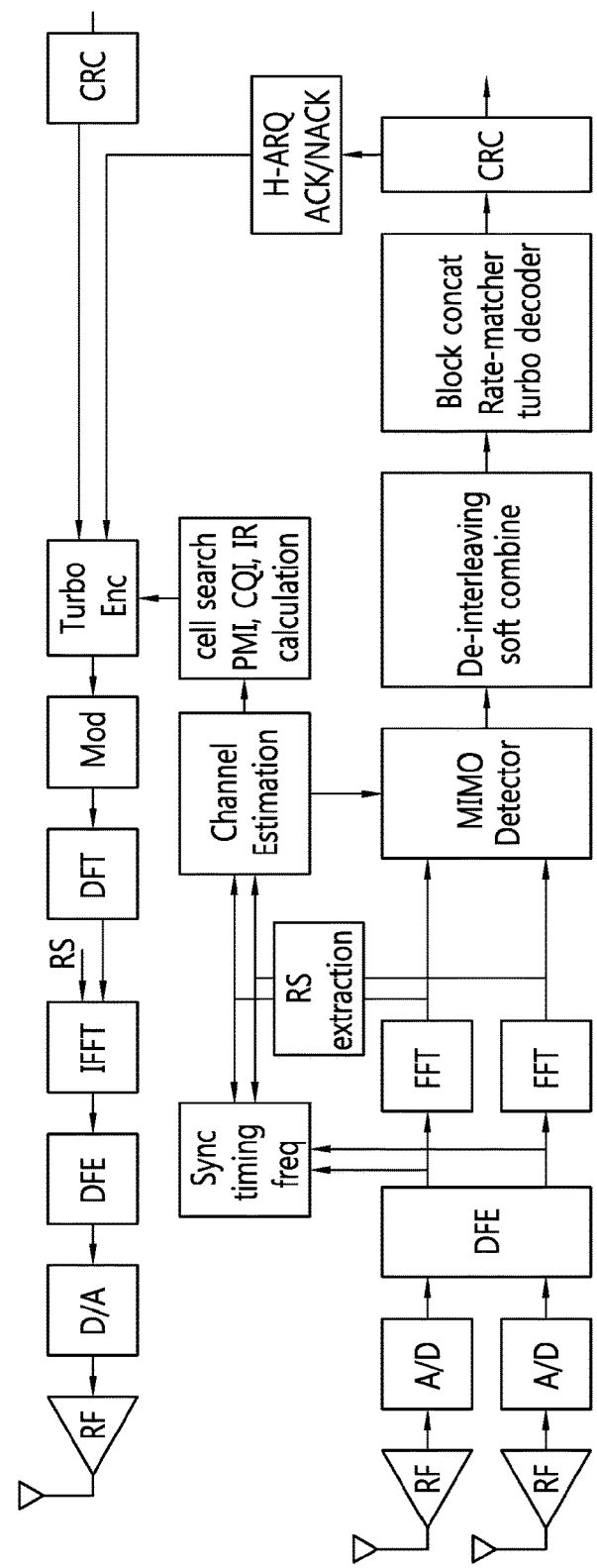

[Fig. 16]
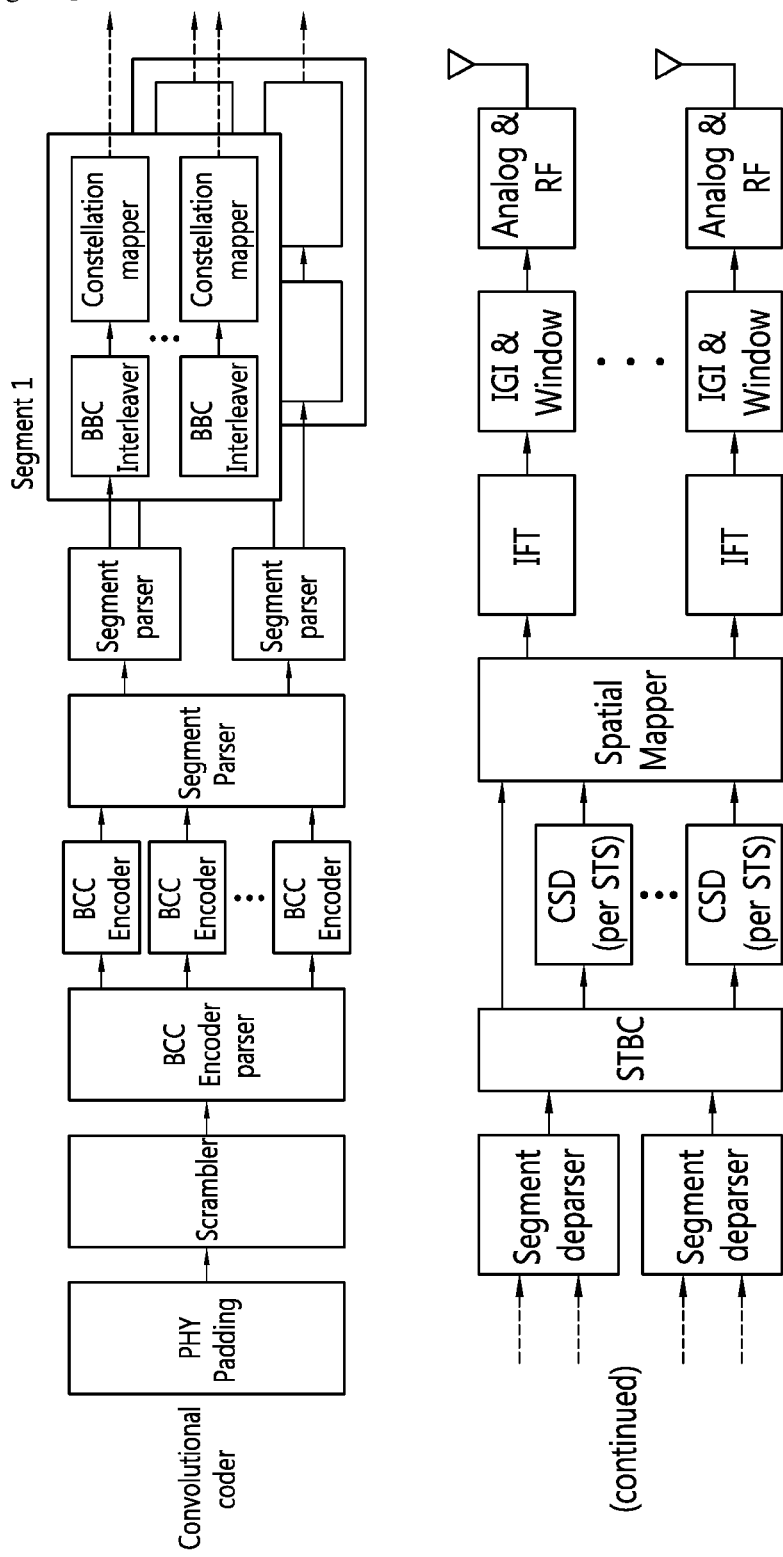
(continued)

[Fig. 17]
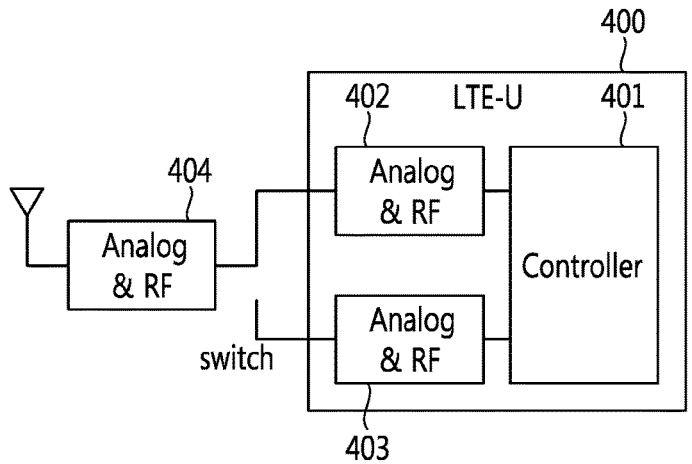
[Fig. 18]
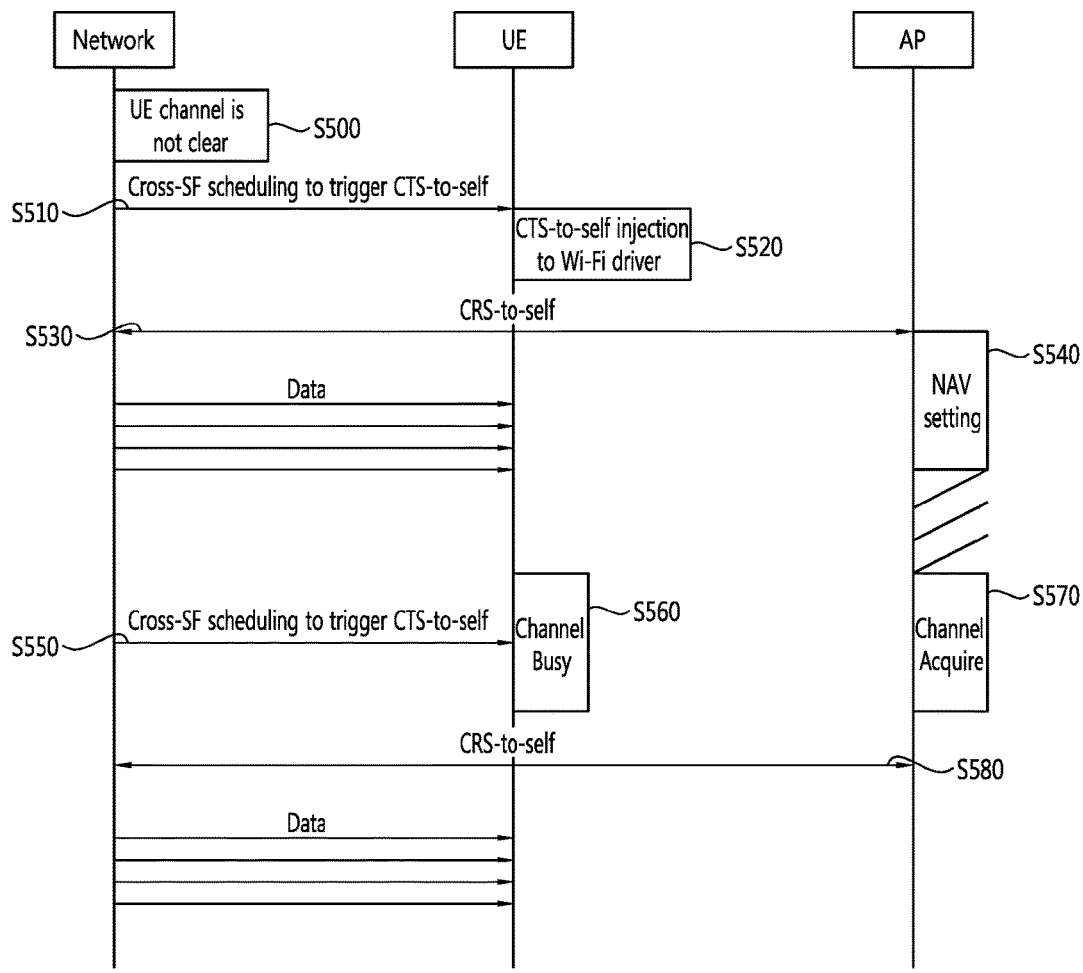

[Fig. 19]
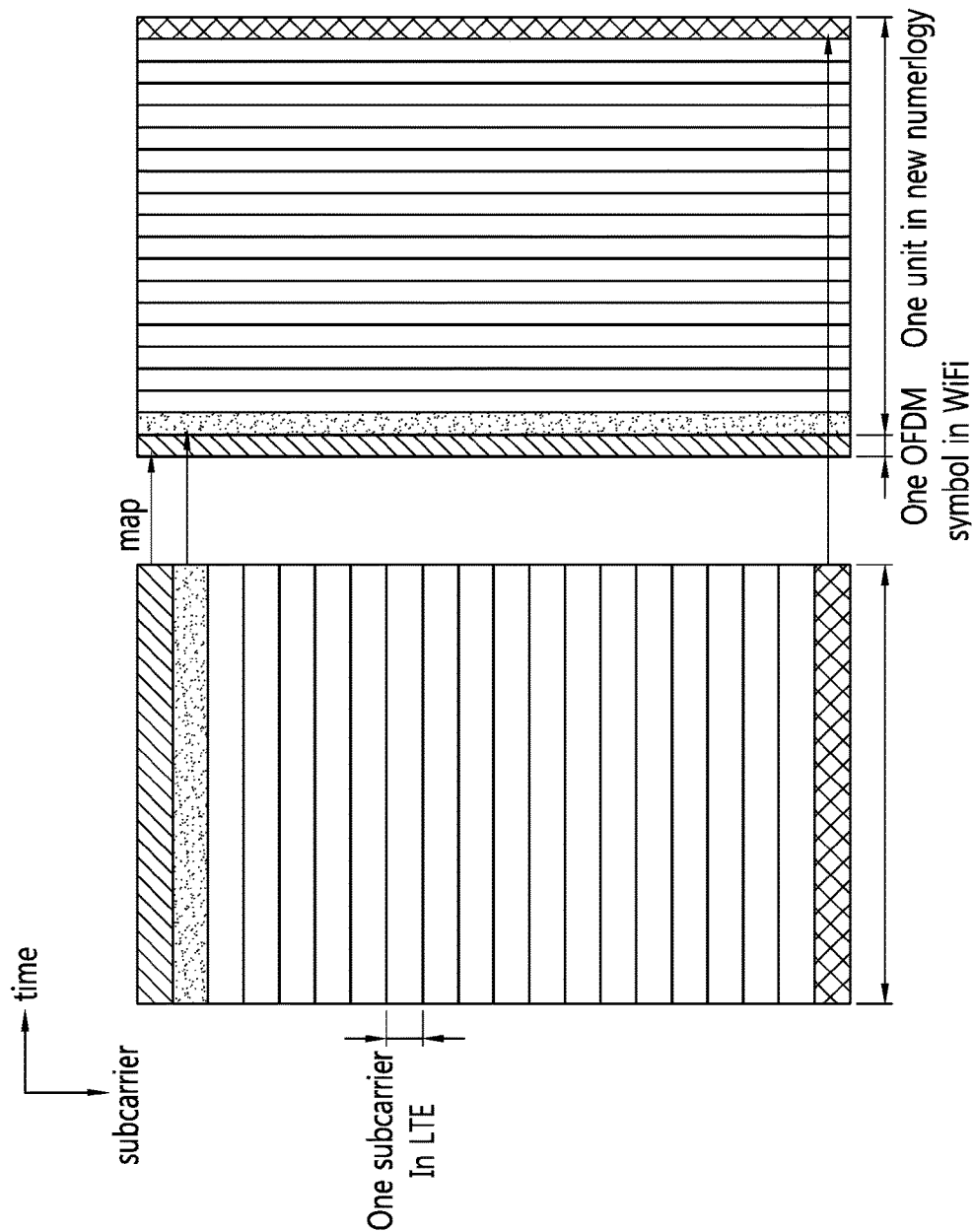

[Fig. 20]
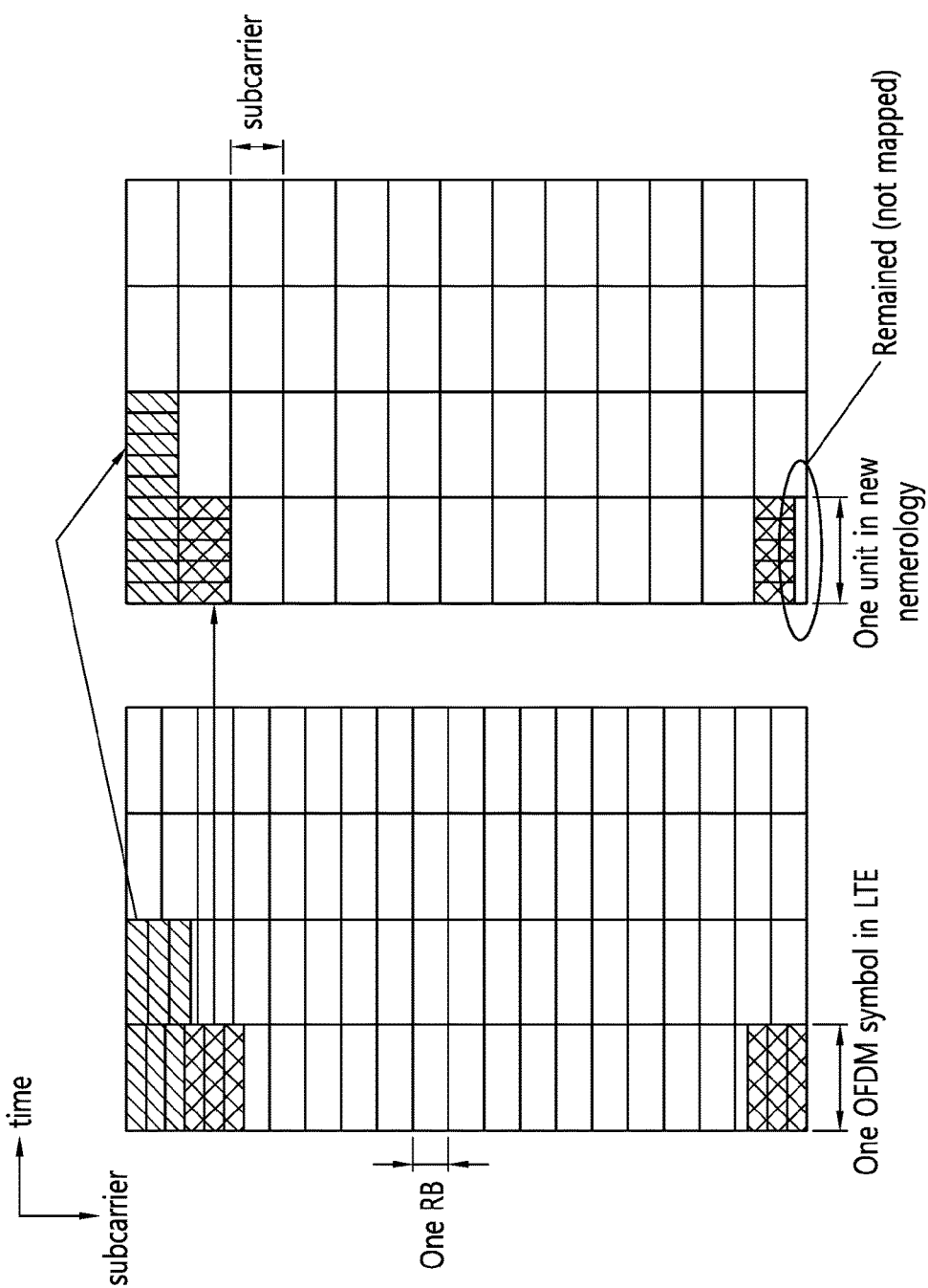

[Fig. 21]
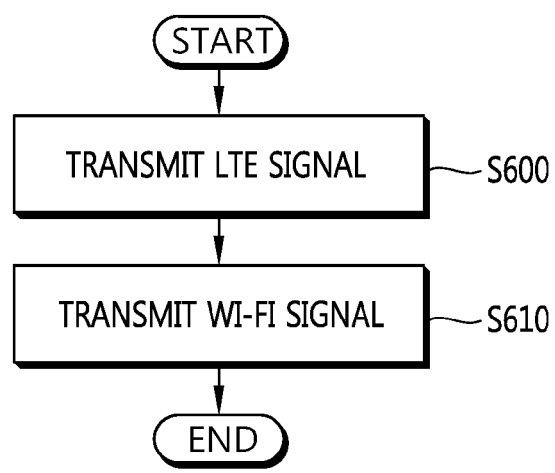

METHOD AND APPARATUS FOR TRANSMITTING WI-FI SIGNALS IN UNLICENSED SPECTRUM IN WIRELESS COMMUNICATION SYSTEM

CROSS REFERENCE TO RELATED APPLICATIONS

This application is the National Phase of PCT International Application No. PCT/KR2015/007267, filed on Jul. 13, 2015, which claims priority under 35 U.S.C. 119(e) to U.S. Provisional Application No. 62/023,195, filed on Jul. 11, 2014 and U.S. Provisional Application No. 62/033,667, filed on Aug. 6, 2014, all of which are hereby expressly incorporated by reference into the present application.

TECHNICAL FIELD

The present invention relates to wireless communications, and more particularly, to a method and apparatus for transmitting Wi-Fi signals in an unlicensed spectrum in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities.

Further, as the demands on data rate keeps increasing, the utilization/exploration on new spectrum and/or higher data rate is essential. As one of a promising candidate, utilizing unlicensed spectrum, such as 5 GHz unlicensed national information infrastructure (U-NII) radio band, is being considered. A method for operating in unlicensed spectrum efficiently may be required.

DISCLOSURE OF INVENTION

Technical Problem

The present invention provides a method and apparatus for transmitting Wi-Fi signals in an unlicensed spectrum in a wireless communication system. The present invention provides a method and apparatus for transmitting a reservation signal as a form of a Wi-Fi signal. The present invention provides a method and apparatus for transmitting a Wi-Fi signal with a long-term evolution (LTE) signal.

Solution to Problem

In an aspect, a method for transmitting, by a device supporting long-term evolution in unlicensed spectrum (LTE-U), a reservation signal in a wireless communication system is provided. The method includes transmitting the reservation signal as a form of a Wi-Fi signal to a network.

In another aspect, a device supporting long-term evolution in unlicensed spectrum (LTE-U) includes a memory, a transceiver, and a processor coupled to the memory and the transceiver, and configure to control the transceiver to transmit the reservation signal as a form of a Wi-Fi signal.

Advantageous Effects of Invention

A LTE in unlicensed spectrum (LTE-U) device can transmit a Wi-Fi signal, which can be understood by Wi-Fi stations(s), efficiently. Accordingly, channel reservation becomes much cleaner and be friendly to other radio access technology such as Wi-Fi.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe. R
FIG. 5 shows structure of an uplink subframe.
FIG. 6 shows an example of LTE/Wi-Fi coexistence scenario.
FIG. 7 shows another example of LTE/Wi-Fi coexistence scenario.
FIG. 8 shows an example of hardware design according to an embodiment of the present invention.
FIG. 9 shows an example of a method for transmitting a reservation signal according to an embodiment of the present invention.
FIG. 10 shows an example of CTS-to-self according to an embodiment of the present invention.
FIGS. 11 and 12 show an example of MAC payload of CTS-to-self according to an embodiment of the present invention.
FIG. 13 shows another example of MAC payload of CTS-to-self according to an embodiment of the present invention.
FIG. 14 shows an example of a method for generating LTE-CTS according to an embodiment of the present invention.
FIG. 15 shows a block diagram of a typical LTE modem.
FIG. 16 shows a block diagram a typical 802.11ac modem.
FIG. 17 shows an example of a LTE-U modem according to an embodiment of the present invention.
FIG. 18 shows an example of a method for triggering and transmitting CTS-to-self according to an embodiment of the present invention.
FIG. 19 shows an example of resource mapping according to an embodiment of the present invention.
FIG. 20 shows another example of resource mapping according to an embodiment of the present invention.
FIG. 21 shows an example of a method for transmitting a Wi-Fi signal according to an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDCCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In unlicensed spectrum where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

To support communication via LTE-U carrier successfully, as it is unlicensed, necessary channel acquisition and completion/collision handling and avoidance are expected. As LTE is designed based on the assumption that a UE can expect DL signals from the network at any given moment (i.e., exclusive use), LTE protocol needs to be tailored to be used in non-exclusive manner. In terms of non-exclusive manner, overall two approaches may be considered. One is to allocate channels for LTE and LTE-U in time domain by semi-statically or statically. For example, during day time, channels may be used by LTE, and during night time, channels may be not used by LTE. And the other is to compete for acquiring the channel dynamically. The reason for the completion is to handle other RAT devices/networks and also other operator's LTE devices/networks.

For the second approach described above, overall two approaches may be further considered. One is to use basic carrier sensing in a sense of "listen before talk (LBT)", where LTE-U device or AP may not transmit any signal if the channel is sensed as busy. To detect the channel status, the received energy may be simply measured. Additionally, if the channel is busy, backoff mechanism, where the backoff window may be determined based on the number of attempts or the number of transmission that LTE-U devices have successfully completed, may also be applied. Another approach is to use Wi-Fi friendly channel reservation/signaling mechanism, such as ready to send (RTS)/clear to send (CTS) based hand-shaking, CTS-to-self or legacy signal (L_SIG) based channel reservation. Hereinafter, according to an embodiment of the present invention, among the two approaches, the second approach to transmit Wi-Fi signals to reserve/acquire the channel in a more efficient way to compete with Wi-Fi devices will be focused.

As 3GPP LTE and Wi-Fi have different subcarrier spacing, different sample rate, and different numerology, to generate Wi-Fi signals and listen to Wi-Fi signals, hardware changes may be necessary. In general, transmission of Wi-Fi signals may have different changes to be required compared to receiving of Wi-Fi signals. According to an embodiment of the present invention, mechanisms to support Wi-Fi signal transmission will be discussed. Further, mechanisms to support Wi-Fi signal reception will be briefly discussed.

Transmitting Wi-Fi signals according to an embodiment of the present invention is described. One of typical LTE-U AP and Wi-Fi AP coexistence scenarios may be that LTE-U AP and Wi-Fi AP are hidden nodes each other. Considering downlink usage of LTE-U as a dominant scenario, without proper mechanisms to address hidden node, both AP may affect data reception quality of LTE-U devices and Wi-Fi stations.

FIG. 6 shows an example of LTE/Wi-Fi coexistence scenario. The scenario of FIG. 6 corresponds to a homogeneous scenario in which both 3GPP LTE and Wi-Fi may have similar coverage. Channel reservation mechanism may be necessary to handle hidden node issue where both Wi-Fi and 3GPP LTE devices need to be protected from APs.

FIG. 7 shows another example of LTE/Wi-Fi coexistence scenario. The scenario of FIG. 7 corresponds to a heterogeneous scenario, e.g. outdoor/indoor scenario. Even though LTE-U AP may not interfere Wi-Fi communication, LTE-U device may have hidden nodes of Wi-Fi communication. Thus, to protect 3GPP LTE device, it is necessary to consider a mechanism to prevent Wi-Fi device attempting transmission, such as via CTS or CTS-to-self transmission.

For scenario described in FIG. 6, the necessary functionality in terms of Wi-Fi signal transmission from the LTE-U AP may be as follows.

RTS or CTS-to-self: It may be necessary to clear Wi-Fi device in the range of the LTE-U AP transmission CTS: If the LTE-U AP receives data from device(s), it may also require CTS to clear Wi-Fi device not to interfere data reception Data preamble (including L-SIG): As RTS alone may not satisfy the network allocation vector (NAV) setting, unless CTS-to-self is used, data preamble may also be necessary to reserve the channel properly.

The necessary functionality in terms of Wi-Fi signal transmission from the LTE-U device may be as follows.

CTS-to-self: In case data transmission is used by the LTE-U device, CTS-to-self may be useful to clear the channel. CTS-to-self may also be used to clear the channel without intended data transmission as well.

CTS: Upon receiving RTS from the LTE-U AP, CTS may be transmitted. RTS-CTS-DATA based channel reservation may be the most straightforward Wi-Fi friendly channel reservation procedure.

Data preamble (including L-SIG): Similar to case of the LTE-U AP, to clear the channel for data transmission, data preamble may be used.

One or a combination of the signals described above or all signals may be used for channel reservation of unlicensed carrier access by the LTE-U AP.

The required functionality may be similar to scenario described in FIG. 7.

Assuming downlink transmission from the LTE-U AP only, the necessary signal transmission from LTE-U AP/device may be CTS-to-self to clear the channels around itself.

Hereinafter, CTS-to-self transmission by utilizing Wi-Fi chip, where a latency between CTS-to-self command/request from the network and actual transmission of CTS-to-self may be more than a few us or ms, will be focused according to an embodiment of the present invention.

CTS-to-self trigger condition according to an embodiment of the present invention is described. If the LTE-U AP and Wi-Fi devices are hidden nodes each other (e.g. scenario described in FIG. 7), the transmission from the LTE-U AP may not be heard by Wi-Fi devices. Thus, Wi-Fi devices may assume that the channel is idle and then may attempt to transmit signals. When near-by Wi-Fi device starts transmission, it is likely that reception quality of LTE-U device becomes poor due to heavy interference. Particularly, in scenario described in FIG. 7, since the signal from outdoor will be degraded due to the walls, signal to interference-plus-noise ratio (SINR) becomes very poor if hidden node(s) exist. However, at the same time, there may be no Wi-Fi devices which will be hidden nodes from the LTE-U AP. In this case, NAV setting may not be needed. Thus, triggering CTS-to-self may be limited to cases where the UE experiences heavy interference from hidden nodes.

To detect "hidden nodes" from Wi-Fi devices, some measurements may be utilized. One approach is to use LTE-U device measurement on received signal strength indication (RSSI). For example, RSSI may measure interference from LTE and Wi-Fi separately. Another approach is to use existing Wi-Fi measurements, such as channel load and noise histogram. Since noise histogram reports channel busy time used by non-Wi-Fi devices, using two values, the busy time due to Wi-Fi devices may be inferred by the UE. If the channel busy time of neighbour Wi-Fi devices is considerable (e.g. exceeds a certain threshold), the LTE-U AP may assume that the channel quality of UE may be poor due to interference from hidden nodes. In that case, CTS-to-self may be triggered. To support this, it may be considered to configure "report of Wi-Fi measurements" by the network to the UE if the UE has Wi-Fi measurement capability. For that, the UE needs to transmit the capability of Wi-Fi measurement (and/or Wi-Fi signal reception capability) to the network. In terms of capability, the UE may also indicate a set of measurements that the UE supports such that the network may utilize the supported measurements. These Wi-Fi functionality related capabilities may be also used for LTE-U measurement such as RSSI. The information from Wi-Fi measurement may be reported along with LTE-U measurements or LTE-U measurement may utilize the information to estimate the better measurement reports.

Another example of trigger condition may also include the number of "NACKed" transmission or the probability of packet error or CSI feedback from the UE. If the packet error exceeds a certain threshold (e.g. 10%) for the initial transmissions, it may be assumed that either channel state information (CSI) feedback is not appropriate or there are hidden nodes. In this case, enhanced CSI or aperiodic feedback may be triggered or hidden node may be assumed so that the network may trigger CTS-to-self mechanism. If radio resource management (RRM) measurement is reported as good though CSI feedback is reported rather poor, the LTE-U AP may consider that there is possibility of hidden nodes.

Another example of trigger condition may be UE-initiated. The UE may transmit "Hidden_Node_Issue" if the channel condition becomes poor. In terms of determination of channel condition, the UE may use Wi-Fi measurements (such as channel load) or use LTE-U CSI feedback. For example, if wide-band CQI becomes lower than a threshold though that reference signal received power (RSRP) to the LTE-U AP is considerably high, then the UE may assume that the channel is interference-limited. Then, it may request initializing CTS-to-self mechanism.

CTS-to-self configuration according to an embodiment of the present invention is described. When CTS-to-self mechanism is initiated, it is assumed that the LTE-U device may not transmit CTS-to-self immediately due to inter-processor/chip delay.

FIG. 8 shows an example of hardware design according to an embodiment of the present invention. Referring to FIG. 8, an eNB 100 includes a processor 101, a memory 102, a LTE/LTE-A transceiver 103, a LTE-U transceiver 104 and a Wi-Fi transceiver 105. A UE 110 includes a processor 111, a memory 112, a LTE/LTE-A transceiver 113, a LTE-U transceiver 114 and a Wi-Fi transceiver 115.

There may be the LTE-U transceiver 104, 114 which handles LTE proptocols in unlicensed band, the Wi-Fi transceiver 105, 115 which performs Wi-Fi protocols which are connected via inter-chip/processor bus, and the processor 101, 111. Due to the latency and the mechanism between chips, it is assumed that the latency between initiating CTS-to-self from the LTE-U transceiver 104, 114 or the LTE/LTE-A transcever 103, 113 and performing CTS-to-self by the Wi-Fi transceiver 105, 115 is not negligible (e.g. about ~1 ms). Also, CTS-to-self may be transmitted when the channel is idle, the UE is not in NAV setting, or the UE is not receiving not to interfere with on-going transmission. If the channel is idle or the UE is receiving some data or NAV is set, CTS-to-self transmission needs to be deferred until the situation gets cleared. Thus, actual transmission of CTS-to-self may occur with some latency. The command to initiate CTS-to-self from the LTE-U transceiver 104, 114 or the LTE/LTE-A transceiver 103, 113 to the Wi-Fi transceiver 105, 115 may have duration information (or equivalent information such as packet size) to be included in CTS-to-self, and may optionally have valid time which may be used to cancel CTS-to-self transmission if CTS cannot be transmitted in the valid time window.

Even though the UE may determine the trigger condition of CTS-to-self, it is desirable that the network configures actual transmission as the UE is receiving and transmitting data based on the network scheduling. It is not desirable to trigger CTS-to-self if there is no data transmission to the UE regardless of channel condition. Thus, the present invention may assume that the network configures and initiates the CTS-to-self transmission mechanism. Similar to sounding reference signal (SRS) or CSI mechanism, both aperidoc and periodic CTS-to-self transmission may be considered. For aperiodic CTS-to-self, if the network transmits aperidoc CTS-to-self request at subframe n, the UE may transmit CTS-to-self command to the Wi-Fi transceiver within 2 ms to minimize the latency. Assuming that CTS-to-self trigger may be initiated by PDCCH only, the delay may be reduced to 1 ms. In other words, the UE may transmit CTS-to-self command within 1 ms, once PDCCH to trigger aperiodic CTS-to-self is received. To initiate aperidoc CTS-to-self, a new DCI field may be used. Or, if the LTE-U device does not have any uplink transmission, then SRS will not be triggered. Thus, SRS trigger field may be reused to initiate CTS-to-self.

For periodic CTS-to-self, higher layer may configure at least one of the followings.

Periodicity of CTS-to-self: interval between two CTS-to-self transmission

Duration of CTS-to-self: duration to be included in CTS-to-self

Valid time of CTS-to-self: tolerable latency of CTS-to-self transmission

Start time of CTS-to-self: when to start CTS-to-self transmission

Duration of periodic CTS-to-self transmission: how long to continue transmission of CTS-to-self Receiver address (RA): In case that CTS-to-self uses dedicated RA to support inter-operator coexistence scenario, RA may be configured by higher layer as well.

Temporary stop periodic CTS-to-self transmission according to an embodiment of the present invention is described. When periodic CTS-to-self transmission is configured, the UE should initiate CTS-to-self only if there is potentially data transmission in planned or on-going to the UE. Otherwise, the UE may waste the channel. One way to guarantee CTS-to-self transmission only with potential data transmission may be to use validation command by the network. The network may transmit validation command of CTS-to-self before CTS-to-self transmission timing if the network has data to the UE (so that the network is planning to schedule data to the UE). If the UE has not received any validation command, the UE shall not trigger CTS-to-self even though periodic CTS-to-self transmission has been configured. Another approach is to transmit CTS-to-self only if there is on-going transmission from the network. Another approach is that the network may transmit buffer status of the UE to the UE periodically. Depending on the buffer status, the UE may trigger CTS-to-self or not. For example, if buffer status is low, i.e., there is not much activity planned, the UE may not trigger CTS-to-self. Otherwise, CTS-to-self may be triggered. Another approach is to trigger CTS-to-self only if reported CQI is high (and thus the network may schedule high modulation and coding scheme (MCS)) and periodic CTS-to-self is configured. Furthermore, combinations of one or more approached described above may also be considered.

Measurement aspects with periodic CTS-to-self transmission configured according to an embodiment of the present invention is described. If the UE transmit CTS-to-self periodically, the channel quality between two subframes where CTS-to-self is not used and CTS-to-self is used may be quite different. Particularly, if the UE measures CSI on subframes where data transmission occurs, all subframes may not experience similar interference. More specifically, if the UE has many hidden Wi-Fi nodes, the interference with clearing the channel and without clearing the channel may be quite different. Thus, it is necessary to measure separate CSI and RRM measurement when clear-the-channel is used from the other case. For that, the Wi-Fi transceiver may transmit "success" or "failure" of CTS-to-self transmission, once it transmits CTS-to-self to the LTE/LTE-A/LTE-U transceiver. Once it receives "success", for the duration where CTS-to-self has cleared the channel, the UE may measure CSI/RRM assuming that the channel is clear (i.e. no interference from Wi-Fi). If separate CSI-IM for interference from Wi-Fi signals or RRM-IM for interference from Wi-Fi signals are used, this may not be necessary.

However, it is still useful to know estimated CSI/RRM results if the channel is clear. The UE may report both CSI feedbacks (assuming clear-to-channel and without clear-to-channel) to the network. The network may use different MCS depending on whether the UE clears the channel or not. To acquire the information of channel clear, "success" of CTS-to-self may be also informed back to the network. For that, semi-static PUCCH resource may be reserved where the UE uses the semi-static PUCCH resource to transmit CTS-to-self success information. It may be similar to scheduling request (SR) PUCCH resource. If CTS-to-self is succeeded, positive resource may be used. Otherwise, negative resource may be used. When HARQ-ACK and/or CSI feedback needs to be transmitted, aggregation similar to SR+PUCCH may be used.

Cross-subframe scheduling according to an embodiment of the present invention is described. Cross-subframe scheduling for PDSCH where the UE may trigger CTS-to-self when it receives PDCCH (cross-carrier scheduled) may be used. Along with multi-subframe scheduling, CTS-to-self duration may be set to the number of subframes where one PDCCH is scheduled. This may be assumed as implicit request of aperiodic CTS-to-self transmission. Since there may be channel sensing delay between PDCCH and actual PDSCH transmission, CTS-to-self may be transmitted earlier than actual channel acquisition time. Thus, the network may configure average channel sensing time to the UE, so that the UE may delay transmission of CTS-to-self for average channel sensing time.

It is also noted that the periodic trigger of Wi-Fi signal may be applied to RTS or CTS or other Wi-Fi signals without loss of generality.

FIG. 9 shows an example of a method for transmitting a reservation signal according to an embodiment of the present invention. In step S200, the LTE-U device transmits a reservation signal as a form of Wi-Fi signal. The device may be a LTE-U AP or LTE-U UE. The reservation signal is one of a RTS, a CTS, a data preamble including a legacy signal or a CTS-to-self.

For the CTS-to-self, the UE may further determine a trigger condition of the CTS-to-self. The CTS-to-self may be triggered by using Wi-Fi channel measurement of LTE-U CSI feedback. The CTS-to-self may be triggered when packet error exceeds a certain threshold. The CTS-to-self may be triggered by UE-initiated. The CTS-to-self may be transmitted aperiodically or periodically. For the periodic CTS-to-self transmission, the UE may further receive at least one of a periodicity of the CTS-to-self, a duration of the CTS-to-self, a valid time of the CTS-to-self, a start time of the CTS-to-self or a RA for the CTS-to-self. The transmission of the periodic CTS-to-self may be temporally stopped. The UE may further transmit both an actual CSI feedback and an estimated CSI feedback to the network for the periodic CTS-to-self.

Hereinafter, mechanisms to allow minimum Wi-Fi signal transmission will be focused according to an embodiment of the present invention. Specifically, a method for transmitting a Wi-Fi signal in an aspect of hardware according to an embodiment of the present invention is described below. There may be four approaches to transmit a Wi-Fi signal according to an embodiment of the present invention.

(1) New LTE-signal emulating CTS-to-self: One approach is to create a new signal with a set of predetermined parameters to create CTS-to-self. Though an embodiment of the present invention focuses on CTS-to-self, the similar approach may be applied to RTS or CTS, which may be used for channel reservation signal. Furthermore, this approach may also be applied to any reservation signal newly proposed in Wi-Fi protocol if any.

FIG. 10 shows an example of CTS-to-self according to an embodiment of the present invention. CTS-to-self includes a media access control (MAC) header, including a frame control field, duration field, and RA field, and a frame check sequence (FCS) field. To generate CTS-to-self, the RA field may be set to the MAC address of the transmitter.

FIGS. 11 and 12 show an example of MAC payload of CTS-to-self according to an embodiment of the present invention. FIGS. 11 and 12 show PHY packet format for CTS-to-self where data includes SERVICE field of 16 bits and TAIL field of 6 bits and necessary Pad Bits to be aligned with 8 bits boundary.

FIG. 13 shows another example of MAC payload of CTS-to-self according to an embodiment of the present invention. FIG. 13 shows more detailed diagram of legacy short training field (L-STF), legacy long training field (L-LTF), L-SIG and data. Equation 1 is an example of a sequence used for L-STF.

$$S_{-26,26} = \sqrt{(13/6)} \times \{0,0,1+j,0,0,0,-1-j,0,0,0,1+j,0,0,0,-1-j,0,0,0,-1-j,0,0,\\ 0,1+j,0,0,0,0,0,0,-1-j,0,0,0,-1-j,0,0,0,1+j,0,0,\\ 0,1+j,0,0,0,1+j,0,0,0,1+j,0,0\}$$ <Equation 1>

Equation 2 is an example of a sequence used for L-LTF.

$$L_{-26,26} = \{1,1,-1,-1,1,1,-1,1,-1,1,1,1,1,1,-1,-1,1,1,-1,\\ 1,-1,1,1,1,1,0,1,-1,-1,1,1,-1,1,-1,1,-1,-1,1,-\\ 1,-1,1,1,-1,-1,1,1,-1,1,-1,1,1,1,1,1\}$$ <Equation 2>

In FIG. 13, GI means guard interval which corresponds to CP in LTE signal formats. The signal portion (using reserved bits or data) may be modulated using binary phase shift keying (BPSK) and mapped to 52 subcarriers (spaced at 312.5 KHz). Thus, LTE-CTS format may be the same as Wi-Fi format using BPSK with 312.5 KHz subcarrier spacing.

FIG. 14 shows an example of a method for generating LTE-CTS according to an embodiment of the present invention. In step S300, for signal and data portion, precoding is performed using BPSK. In step S310, for the physical resources, coded symbols is mapped to physical resource frequency first and then time. For example, it may follow Wi-Fi OFDM symbol duration and subcarrier spacing. Assuming 64 subcarriers, as Wi-Fi signal uses only 52 subcarriers out of 64 carriers, 12 carriers may be filled with NULL values. Specifically, only 52 subcarriers may be used, 4 subcarriers may be used for pilot and one DC may also not be used for data mapping. For example, for SIGNAL part, −26 to 26 subcarrier index may be filled with BPSK symbols. Once the resource mapping is done, in step S320, via signaling generation process, the Wi-Fi signal may be generated and then transmitted.

To allow less impact on LTE hardware, it may be also considered that pre-generated mapped signals per each subcarrier may be stored and used, instead of generating signals every time as CTS field may not change.

In current design of LTE and Wi-Fi (e.g. 802.11ac), the sampling rate of LTE and Wi-Fi are different though that the bandwidth may be aligned (where both LTE and Wi-Fi can support 20 MHz bandwidth). For example, the sampling duration of LTE is about 32.6 ns, whereas Wi-Fi uses about 50 ns. Since two systems use different sampling rate, individual digital-to-analog converter (DAC) may be used to generate Wi-Fi signal and LTE signal, respectively. The drawback of this approach is to have additional hardware and also manage the fast switch between two different hardware components. However, as a simple approach, having individual DAC with supporting different sampling rate between Wi-Fi and LTE signals may be considered.

Alternatively, over-sampling for both LTE and Wi-Fi signals may be used. For example, to align Wi-Fi and LTE signals' sampling rate exactly, oversampling rate for LTE may be around 125 times, whereas for Wi-Fi may be around 192 times. This approach may be similar to approach 2 to be described below. Since this may incur too much hardware cost, approximately, two times for LTE and three times for Wi-Fi may be considered where sampling occurs every 16.3 ns. Since this approach does not follow exact sampling rate for both LTE and Wi-Fi system, the performance degradation may be expected. One approach is to align LTE sampling rate (e.g., sampling every 16.3×ns which is ½ times of LTE sampling frequency) and then uses the same sampling rate for Wi-Fi (approximately three times oversampling). In this case, the performance degradation on Wi-Fi signals only is expected. Due to not exactly matched sampling rate, the maximum frequency offset may become around 240 KHz, especially in the farthest subcarrier from the center DC. Thus, the reception quality of those signals may not be desirable.

To enhance this approach a bit further without introducing too much hardware complexity, it may be considered to have separate 64 transmission bank where each bank is mapping to one subcarrier of Wi-Fi system. Instead of performing sampling as a whole, each band may perform sampling following LTE sampling rate. Then, signals from 64 banks (matching 64 subcarriers) may be aggregated and forwarded to DAC and then transmitted.

For example, RTS or CTS signal (or other Wi-Fi signal) may be generated by separating 64 banks/subcarriers (e.g. $\cos(f0)t, \cos(f0\pm312.5*2p)t, \ldots \cos(f0\pm i*312.5*2p) \ldots$ where f0 is assumed as center frequency and where pilot signals may also be generated matching to Wi-Fi signal structure). Each signal may be sampled following LTE sampling rate, and then will be transmitted after DAC processing. This may require change the hardware of LTE. For example, different fast Fourier transform (FFT) size or different mechanism of creating signals may be used to align with Wi-Fi subcarrier spacing.

For the convenience, the above description according to an embodiment of the present invention focuses on transmission of Wi-Fi signals. However, the present invention is not limited thereto, and approaches described above according to an embodiment of the present invention may be applied to Wi-Fi signal reception.

(2) Embedded Wi-Fi processor: Another approach for further consideration is to use embedded Wi-Fi processor within LTE processor where Wi-Fi transceiver is controlled by LTE baseband (BB). More specifically, it may be also considered that the transceiver is shared between Wi-Fi and LTE where LTE BB contains Wi-Fi BB capabilities.

FIG. 15 shows a block diagram of a typical LTE modem. Referring to FIG. 15, the data flow for transmission in the LTE modem follows "turbo encoder→modulation→discrete Fourier transform (DFT)→inverse FFT (IFFT)→D/A".

FIG. 16 shows a block diagram a typical 802.11ac modem. Referring to FIG. 16, the data flow for transmission in the 802.11ac modem follows "convolutional coder-→interleaver & mapping→intermediate frequency transformer (IFT)→IGI". Due to its different protocol and mechanism, to combine two functionality, it may be desirable to have a switch before "analog & RF" between LTE and Wi-Fi baseband.

FIG. 17 shows an example of a LTE-U modem according to an embodiment of the present invention. Referring to FIG. 17, a LTE-U device 400 includes a controller 401, a LTE BB 402, a Wi-Fi BB 403, and analog & RF 404. The analog & RF 404 is shared between two functionalities with two distinct baseband processors, i.e. the LTE BB 402 and Wi-Fi BB 403, to produce different radio access technology (RAT) waveforms.

(3) Individual Wi-Fi processor (utilizing inter-chip communication): Another approach is to utilize Wi-Fi driver to generate CTS-to-self like Wi-Fi signals. In this case, to address inter-chip latency in terms of injecting Wi-Fi signals to the Wi-Fi driver, a type of periodic CTS-to-self trigger may be considered. Or, cross-subframe type scheduling may also be used to trigger CTS-to-self.

FIG. 18 shows an example of a method for triggering and transmitting CTS-to-self according to an embodiment of the present invention. In step S500, the network considers that the UE channel is not clear. Accordingly, the network may consider that CTS-to-self by a UE is needed to protect UE reception. In step S510, the network requests CTS-to-self by cross-carrier scheduling where the actual transmission can occur once the network hears CTS-to-self from the UE. It is assumed that the network can hear Wi-Fi signals. That is, when the network needs to clear the channel of a target UE, the network may initiate CTS-to-self from the UE via cross-subframe scheduling, which can include initiation of CTS-to-self which will be triggered immediately once (E)PDCCH is decoded, duration which may be included in CTS-to-self as duration of data transmission, or a RA if MAC address of the UE is not used. In step S520, the UE inject CTS-to-self to the Wi-Fi driver, and in step S540, CTS-to-self is transmitted. In step S540, NAV setting is performed. Further, in step S550, when the network needs to clear the channel of a target UE, the network may initiate CTS-to-self from the UE via cross-subframe scheduling. In step S560, the UE channel is busy. In step S570, the AP acquires the channel. In step S580, CTS-to-self is transmitted.

Since CTS-to-self may be transmitted by a station, it would be desirable that the UE is associated with the Wi-Fi AP as well. In other words, to trigger Wi-Fi signals, the UE may be associated with the Wi-Fi AP which uses the same channel as for LTE-U AP serving the UE as a primary channel (in 802.11n or 802.11ac) or as a main channel. In other words, the UE may establish a connection with the Wi-Fi AP which operates in the same frequency as serving LTE base-station (and thus interfere on-going LTE transmission). Similarly, the LTE-U AP may transmit Wi-Fi signals to clear the channel to receive or transmit LTE signals. In that case, the LTE-U AP may become an AP or may become a station and establish a connection with a neighbor AP. Or, it may act as in ad-hoc mode without connection establishment with Wi-Fi AP.

If this approach is used, controlling software/driver can inject Wi-Fi signals (e.g. CTS-to-self) on Wi-Fi driver/ module for transmission and thus it may require hardware/ software changes, though that the required changes may be much less than approach 2.

(4) New numerology: To consider better coexistence and utilize better of unlicensed spectrum, it may be also considered to share "IGI and IFT" of Wi-Fi modem. In this case, numerology of LTE needs to be changed to be more aligned with Wi-Fi. One simple example is to reuse subcarrier spacing and FFT size of Wi-Fi protocols (such as 312.5 KHz and 64). For FFT size, it may be a multiple of Wi-Fi FFT size. The benefit of this approach is that the same RF can be shared between Wi-Fi and LTE system. Thus, RF requirements of LTE-U may follow Wi-Fi system requirements (and thus reuse the requirements) and thus may provide better coexistence with Wi-Fi system. Major different of utilizing LTE-U in this case is to utilize LTE protocols such as inter-cell interference coordination (ICIC), centralized controller/scheduler, robust RS design, etc. By utilizing this approach, better coexistence including carrier sensing, channel reservations, backoff, etc., may be realized.

However, this approach, at the same time, requires changes of LTE frame-structure, resource mapping, RS mapping, etc. Thus, it is still desirable to keep the subframe duration as 1 ms where normal CP may have up to 14 OFDM symbols. It is further considerable to have very short CP in this case similar to Wi-Fi system. In that case, 4 us may be one unit and there may be around 250 OFDM symbols in one subframe. To allow 14 OFDM symbols as in LTE, 18*4 us may form an OFDM symbol where the first slot may take 16*4 us (or the first and the last OFDM symbol may take 17*4 us respectively). Since LTE carrier spacing is about 15

KHz whereas Wi-Fi has 312.5 KHz, there are about 20 subcarriers of LTE in one subcarrier of Wi-Fi signal.

Since the number of available Wi-Fi subcarrier may be around 54 in 20 MHz system whereas LTE has about 1200 subcarriers, to match the subcarrier spacing, about 20 subcarriers of LTE matches to one subcarrier of Wi-Fi. Thus one way to have a similar data resource element mapping is to have 20 Wi-Fi OFDM symbol (80 us) as a unit in that case 1 ms may have about 12 units. In one unit, data mapped to 20 REs in LTE may be mapped.

FIG. 19 shows an example of resource mapping according to an embodiment of the present invention. Referring to FIG. 19, each RE maps to shorter OFDM symbol with larger subcarrier. In this case, the number of units may be around 12 (which is same to the number of OFDM symbols in extended CP). Thus, the resource mapping may follow extended CP frame structure. To map subcarrier RE to one symbol in new numerology, mapping may start either from the lowest frequency or the center or the highest frequency.

FIG. 20 shows another example of resource mapping according to an embodiment of the present invention. One subcarrier in one OFDM symbol for LTE is mapped to one unit in new numerology for Wi-Fi. Further, mapping starts from the lowest frequency.

FIG. 21 shows an example of a method for transmitting a Wi-Fi signal according to an embodiment of the present invention. In step S600, the LTE-U device transmits the LTE signal, and in step S610, transmits the Wi-Fi signal. The Wi-Fi signal may be emulated in the LTE signal. The Wi-Fi signal may be a CTS-to-self. The Wi-Fi signal may be precoded by binary phase shift keying (BPSK) and is mapped to resource elements. The LTE signal and the Wi-Fi signal may be generated via different DAC, respectively. The LTE signal and the Wi-Fi signal may be over-sampled. The LTE signal may be sampled by two times more than conventional LTE sampling rate, and the Wi-Fi signal may be sampled by three times more than conventional Wi-Fi sampling rate. The Wi-Fi signal may be transmitted by using a Wi-Fi processor which is embedded in a LTE processor. The Wi-Fi signal may be transmitted via a transceiver shared by a Wi-Fi BB and a LTE BB. The Wi-Fi signal may be transmitted by using a Wi-Fi processor which is individual to a LTE processor. A CTS-to-self may be injected to the Wi-Fi processor. The CTS-to-self may be cross-subframe scheduled by a network. The cross-subframe scheduling may include at least one of initiation of the CTS-to-self, a duration of the CTS-to-self, or a RA of the device. The LTE signal may be transmitted by using a subcarrier spacing and a FFT size of Wi-Fi.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a device supporting long-term evolution in unlicensed spectrum (LTE-U), a reservation signal in a wireless communication system, the method comprising:
   determining, by the device, a trigger condition of a clear-to-send (CTS)-to-self,
   wherein the CTS-to-self is triggered by using a Wi-Fi channel measurement of LTE-U channel state information (CSI) feedback or when a packet error exceeds a certain threshold; and
   transmitting, by the device, the reservation signal as a form of a Wi-Fi signal to a network,
   wherein the reservation signal is the CTS-to-self.

2. The method of claim 1, wherein the device is a LTE-U access point (AP).

3. The method of claim 1, wherein the device is a LTE-U user equipment (UE).

4. The method of claim 1, wherein the reservation signal is one of a ready-to-send (RTS), a CTS or a data preamble including a legacy signal.

5. The method of claim 1, wherein the CTS-to-self is triggered by user equipment (UE)-initiated.

6. The method of claim 1, wherein the CTS-to-self is transmitted aperiodically.

7. The method of claim 1, wherein the CTS-to-self is transmitted periodically.

8. The method of claim 7, further comprising receiving at least one of a periodicity of the CTS-to-self, a duration of the CTS-to-self, a valid time of the CTS-to-self, a start time of the CTS-to-self or a receiver address (RA) for the CTS-to-self.

9. The method of claim 7, wherein the transmission of the periodic CTS-to-self is temporally stopped.

10. The method of claim 7, further comprising transmitting both an actual CSI feedback and an estimated CSI feedback to the network for the periodic CTS-to-self.

11. A device supporting long-term evolution in unlicensed spectrum (LTE-U), the device comprising:
    a memory;
    a transceiver; and
    a processor coupled to the memory and the transceiver, and configured to:
    control the transceiver to determine a trigger condition of a clear-to-send (CTS)-to-self, and to transmit a reservation signal as a form of a Wi-Fi signal,
    wherein the reservation signal is the CTS-to-self, and
    wherein the CTS-to-self is triggered by using a Wi-Fi channel measurement of LTE-U channel state information (CSI) feedback or when a packet error exceeds a certain threshold.

* * * * *